(12) United States Patent
Wischmeyer

(10) Patent No.: US 9,260,188 B1
(45) Date of Patent: Feb. 16, 2016

(54) APPARATUS AND METHOD FOR ALLOWING MULTI-MODE USE OF AN AIRCRAFT COCKPIT

(71) Applicant: Gulfstream Aerospace Corporation, Savannah, GA (US)

(72) Inventor: Carl Edward Wischmeyer, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 14/462,197

(22) Filed: Aug. 18, 2014

(51) Int. Cl.
*B64D 11/00* (2006.01)
*B64D 31/02* (2006.01)

(52) U.S. Cl.
CPC .......... *B64D 11/0015* (2013.01); *B64D 31/02* (2013.01)

(58) Field of Classification Search
CPC ........................... B64D 11/0015; B64D 31/02

USPC ............................................................. 701/3
See application file for complete search history.

(56) References Cited

U.S. PATENT DOCUMENTS

| | | | |
|---|---|---|---|
| 2007/0008188 A1 | 1/2007 | Firra | |
| 2012/0256768 A1 | 10/2012 | Kratchounova et al. | |
| 2013/0054055 A1* | 2/2013 | Mathews, Jr. ...... | H04B 7/18506 701/3 |
| 2013/0234867 A1 | 9/2013 | Martin | |

* cited by examiner

*Primary Examiner* — Mary Cheung
*Assistant Examiner* — Brian P Sweeney
(74) *Attorney, Agent, or Firm* — Ingrassia, Fisher & Lorenz PC

(57) ABSTRACT

In one embodiment, multi-mode use of an aircraft cockpit is realized a processor in the aircraft determining whether the aircraft is operating in a flight mode or a non-flight mode. When operating in the non-flight mode, the processor deactivates aircraft engines and permits wireless device access to one or more aircraft systems. When operating in the flight mode, the processor enables aircraft engines and prevents wireless device access to one or more aircraft systems.

20 Claims, 5 Drawing Sheets

APPARATUS AND METHOD FOR ALLOWING MULTI-MODE USE OF AN AIRCRAFT COCKPIT

TECHNICAL FIELD

The technical field relates generally to instrumentation for aircraft and specifically to control of aircraft during non-flight conditions.

BACKGROUND

As modern aviation advances, the demand for ever-increasing capabilities grows. To help meet this demand on the aircraft and on the pilots, modern aircraft include impressive arrays of displays, instruments, and sensors designed to provide the pilot with menus, data, and graphical options intended to enhance pilot performance and overall safety of the aircraft and the passengers. While these displays have been designed for use by pilots during flight, many other personnel access the aircraft to perform various testing, data collection, maintenance or flight preparation services. The number of these displays and the complexity of the aircraft cockpit may be daunting to non-flight personnel who nevertheless need to access the cockpit and perform a requisite service.

As such, it is desirable to provide a simplified cockpit access arrangement that does not require non-flight personnel to operate the complex arrays of cockpit displays and controls. In addition, other desirable features and characteristics will become apparent from the subsequent summary and detailed description, and the appended claims, taken in conjunction with the accompanying drawings and this background.

BRIEF SUMMARY

In one embodiment, an aircraft includes one or more engines to propel the aircraft during flight and one or more aircraft systems to control the aircraft during flight. The aircraft also includes a cabin management system and a processor configured to determine whether the aircraft is operating in a flight mode or a non-flight mode. When operating in the non-flight mode, the processor deactivates aircraft engines and permits wireless device access to one or more aircraft systems. When operating in the flight mode, the processor enables aircraft engines and prevents wireless device access to one or more aircraft systems.

In one embodiment, a method for allowing multi-mode use of an aircraft cockpit includes a processor in the aircraft determining whether the aircraft is operating in a flight mode or a non-flight mode. When operating in the non-flight mode, the processor deactivates aircraft engines and permits wireless device access to one or more aircraft systems. When operating in the flight mode, the processor enables aircraft engines and prevents wireless device access to one or more aircraft systems.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention, which is defined by the claims. Furthermore, there is no intention to be bound by any theory presented in the preceding background or the following detailed description.

Figure 1:
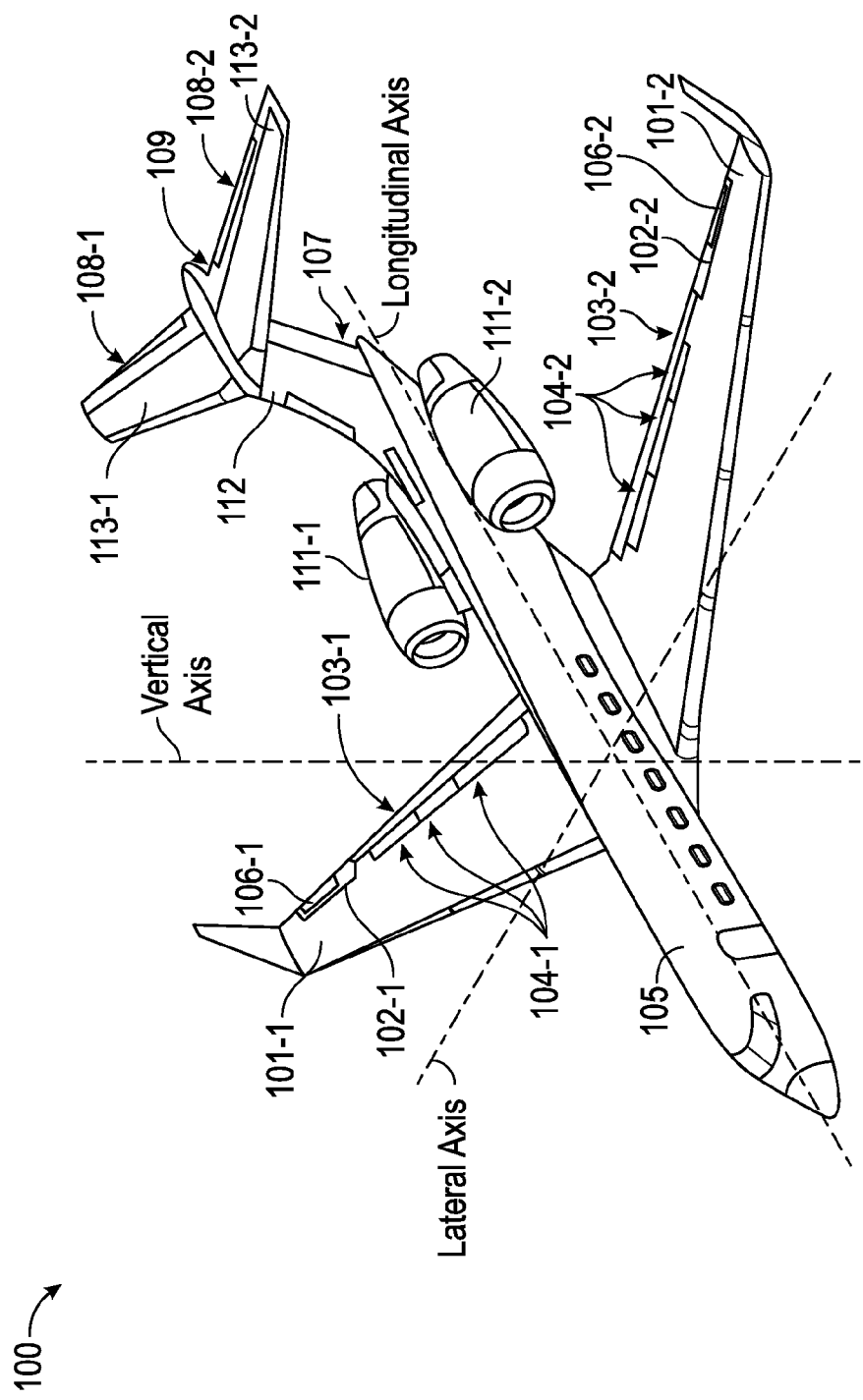
FIG. 1 is an illustration of an aircraft in accordance with an embodiment.

FIG. 1 is a perspective view of an aircraft 100 that can be used in accordance with the exemplary disclosed embodiments. In accordance with one non-limiting implementation, the aircraft 100 includes a fuselage 105, two main wings 101-1, 101-2, a vertical stabilizer 112, an elevator 109 that includes two horizontal stabilizers 113-1 and 113-2 in a T-tail stabilizer configuration, and two jet engines 111-1, 111-2. For flight control, the two main wings 101-1, 101-2 each have ailerons 102-1, 102-2, aileron trim tabs 106-1, 106-2, spoilers 104-1, 104-2 and flaps 103-1, 103-2, while the vertical stabilizer 112 includes a rudder 107, and the aircraft's horizontal stabilizers (or tail) 113-1, 113-2 each include an elevator trim tab 108-1, 108-2. Although not shown in FIG. 1, the aircraft 100 also includes an onboard computer, aircraft instrumentation and various control systems and sub-systems as will be appreciated by those skilled in the art.

Figure 2A:
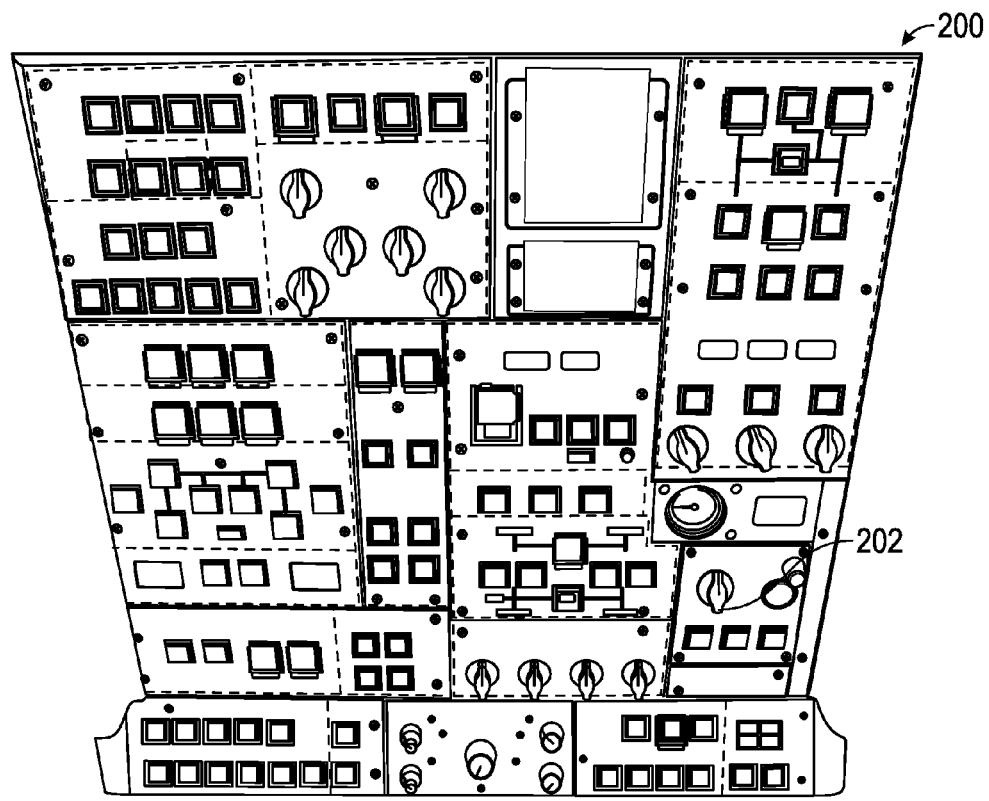
FIG. 2A is an illustration of an overhead switch panel of the aircraft of FIG. 1 in accordance with an embodiment.
Figure 2B:
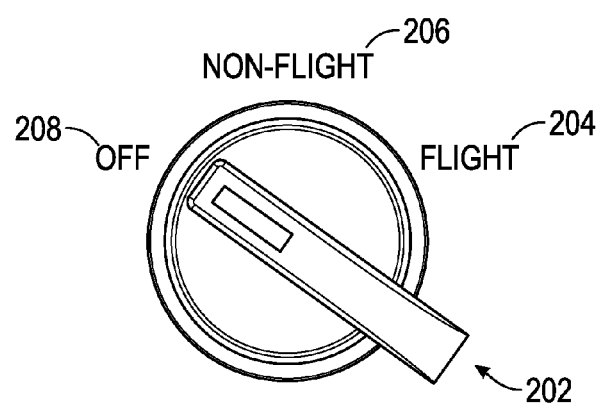
FIG. 2B is an illustration of a switch from the overhead switch panel of the aircraft of FIG. 2A in accordance with an embodiment.

FIG. 2A illustrates a view of aircraft overhead switch panel 200 in accordance with embodiments of the invention. As can be seen, the overhead switch panel 200 has a complex array of switches, which may be intimidating or daunting to those not trained to fly the aircraft. According to exemplary embodiments, the overhead switch panel 200 includes a particular switch 202 that is used to set an operating mode of the aircraft 100. As shown in FIG. 2b, a first mode is a flight mode 204 in which all systems on the aircraft are fully functioning for normal operation of the aircraft. A second mode is a non-flight mode 206, in which the engines (111-1 and 111-2 of FIG. 1) and selected flight systems are deactivated so that engine start and other operations that could potentially damage the aircraft or put personnel at risk are not possible. However, a limited set of functionalities, (e.g., electrical and cabin control systems) are active and available to be accessed by one or more wireless devices (e.g., a tablet computer) used by non-flight personnel when performing a service on the aircraft or flight personnel as the crew prepares the aircraft for flight. In this way, the non-pilot personnel need only interact with the service program operating the wireless device and can access, control or test the various systems on the aircraft using an interface via the wireless device that the non-pilot personnel are comfortable with. This alleviates the need for the non-pilot personnel to have the same aircraft instrumentation knowledge as aircraft pilots. Additional non-flight modes may be implemented for various maintenance needs. As a non-limiting example, pilots may control particular functions externally when performing pre-flight inspections or other external activities, or for wireless control of limited systems to allow for various systems of the airplane to made operational before required crew members arrive. Optionally, a third Off mode 208 for the aircraft instrumentation may be implemented.

Figure 3:
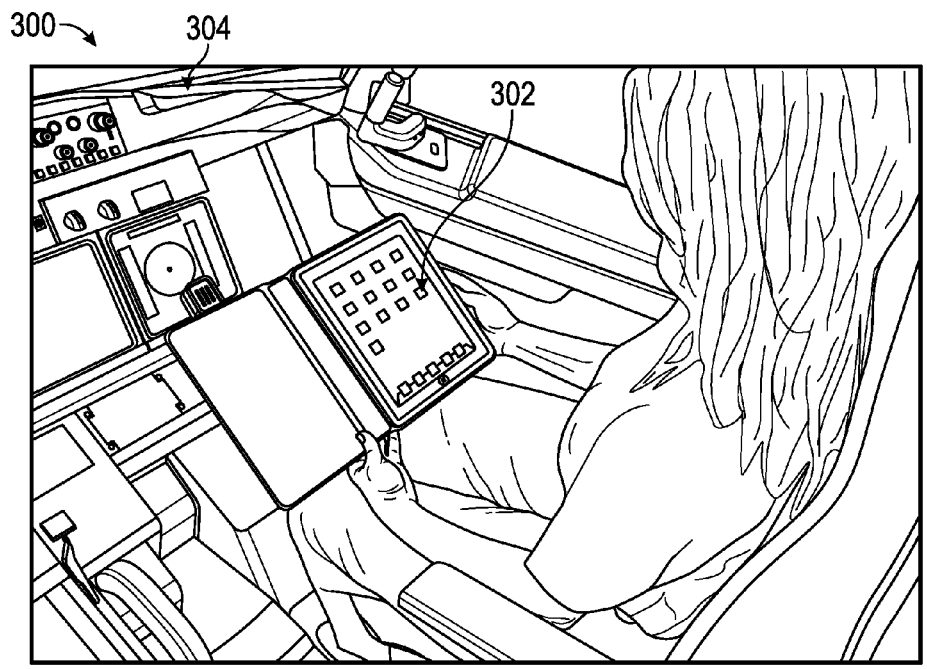
FIG. 3 is an illustration of a maintenance technician performing a service in the cockpit of the aircraft of FIG. 1.

FIG. 3 illustrates a service technician 300 interacting with a wireless device 302 (e.g., a tablet computer) to perform a service in the cockpit 304 of the aircraft. The service person 300 need not have experience setting and operating the complex array of instrumentation in the cockpit 304 as the wireless device can access the flight control systems in the non-flight mode. Accordingly, the service person 300 need only be trained on the wireless device and the application (e.g., test, adjustment, data collection) being used. During some service orders, a system or sensor may be tested with by wireless device. Other service orders may require the downloading or collection of aircraft performance data for analysis. Some service orders may require the uploading of data or software updates for the aircraft. Still other service orders may require the activation of interior or exterior lighting systems to assure performance. As will be appreciated, since the service person can control the various aircraft systems via the wireless device, the service person can exit and move around the aircraft or re-enter the aircraft while in full wireless control of the systems under test. In this way, it doesn't matter which aircraft type or model the service person enters as the wireless device is programmed to access and present the requisite data or controls needed to perform the ordered service provided that the aircraft has incorporated the teachings of the present disclosure to achieve the advantages thereof.

Figure 4:
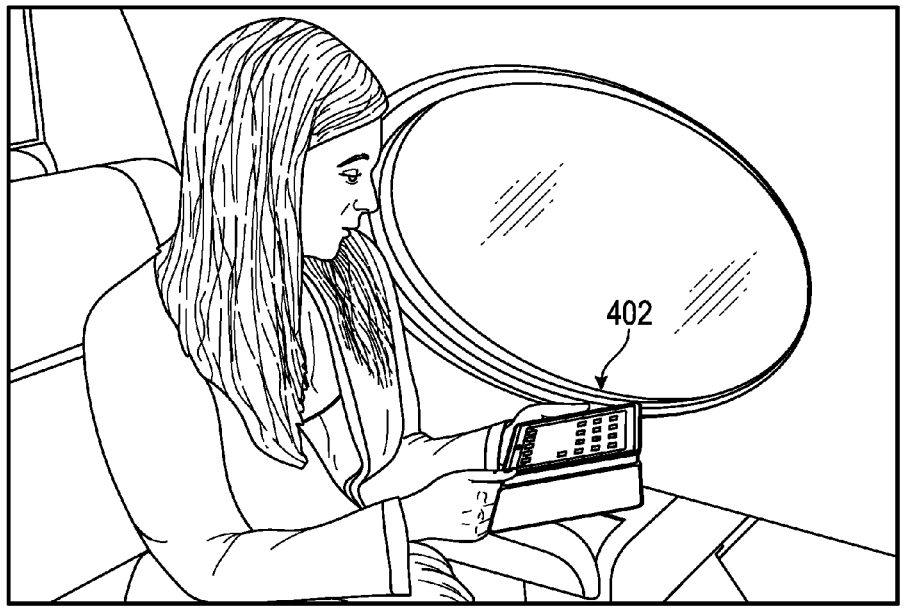
FIG. 4 is an illustration of a flight attendant controlling a cabin management system of the aircraft of FIG. 1.

FIG. 4 illustrates a flight attendant 400 interacting with a wireless device 402 to access and control a cabin management system. As will be appreciated, the cabin management system is a separate system from the flight control systems operated by a pilot during flight. The cabin management system controls the cabin environment (e.g., temperature and humidity) and the cabin entertainment features (e.g., movies or gaming) for the comfort and enjoyment of the passengers. Since the cabin management system is a separate system from the flight control systems, wireless devices are permitted to access the cabin management systems both in the flight mode and the non-flight mode of aircraft operation.

Figure 5:
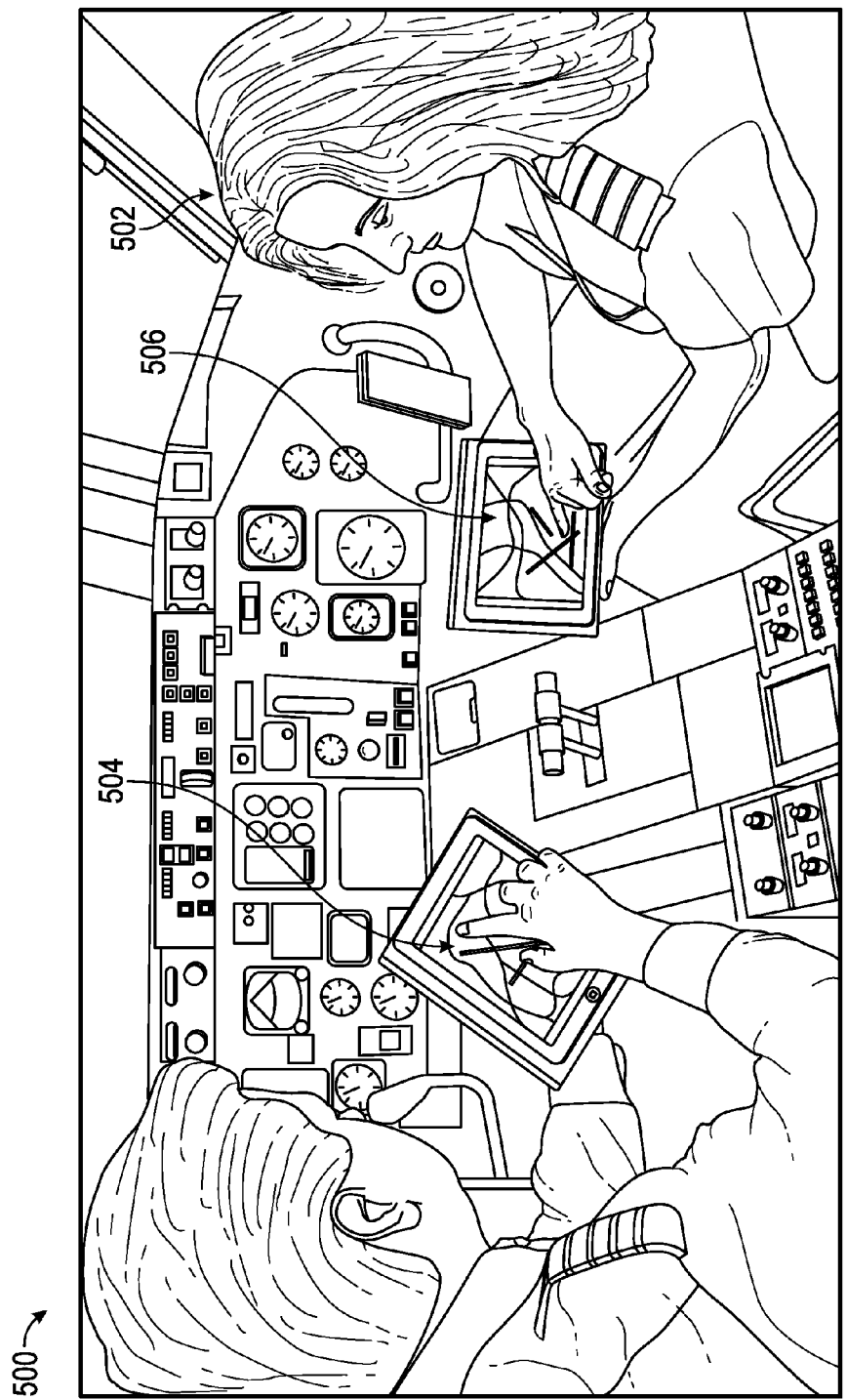
FIG. 5 is an illustration of flight personnel performing pre-flight preparations for the aircraft of FIG. 1.

FIG. 5 illustrates a pilot 500 and co-pilot 502 using wireless devices 504 and 506 (respectively) during a pre-flight check processes. The pilot 500 and co-pilot 502 can enter a flight plan, get weather updates and destination airport features while planning the flight. The pilot and/or co-pilot can also exit the aircraft for the pre-flight walk-around while in full communication with aircraft systems via the wireless device (504 or 506). When ready for flight, the pilot 500 or co-pilot 502 would change the switch (202 of FIG. 2) setting from non-flight to flight. When this occurs, wireless device access is limited to those systems that would be controllable by non-pilots in flight, and full functionality is restored to the cockpit (e.g., since the cabin management system is a separate system from the flight control systems, wireless control of the cabin management system may continue during flight for the comfort and entertainment of the passengers). Upon arriving and parking the aircraft at the destination airport, the switch (202 of FIG. 2) could once again be set to the non-flight position to allow service personnel to service the aircraft via wireless devices.

Figure 6:
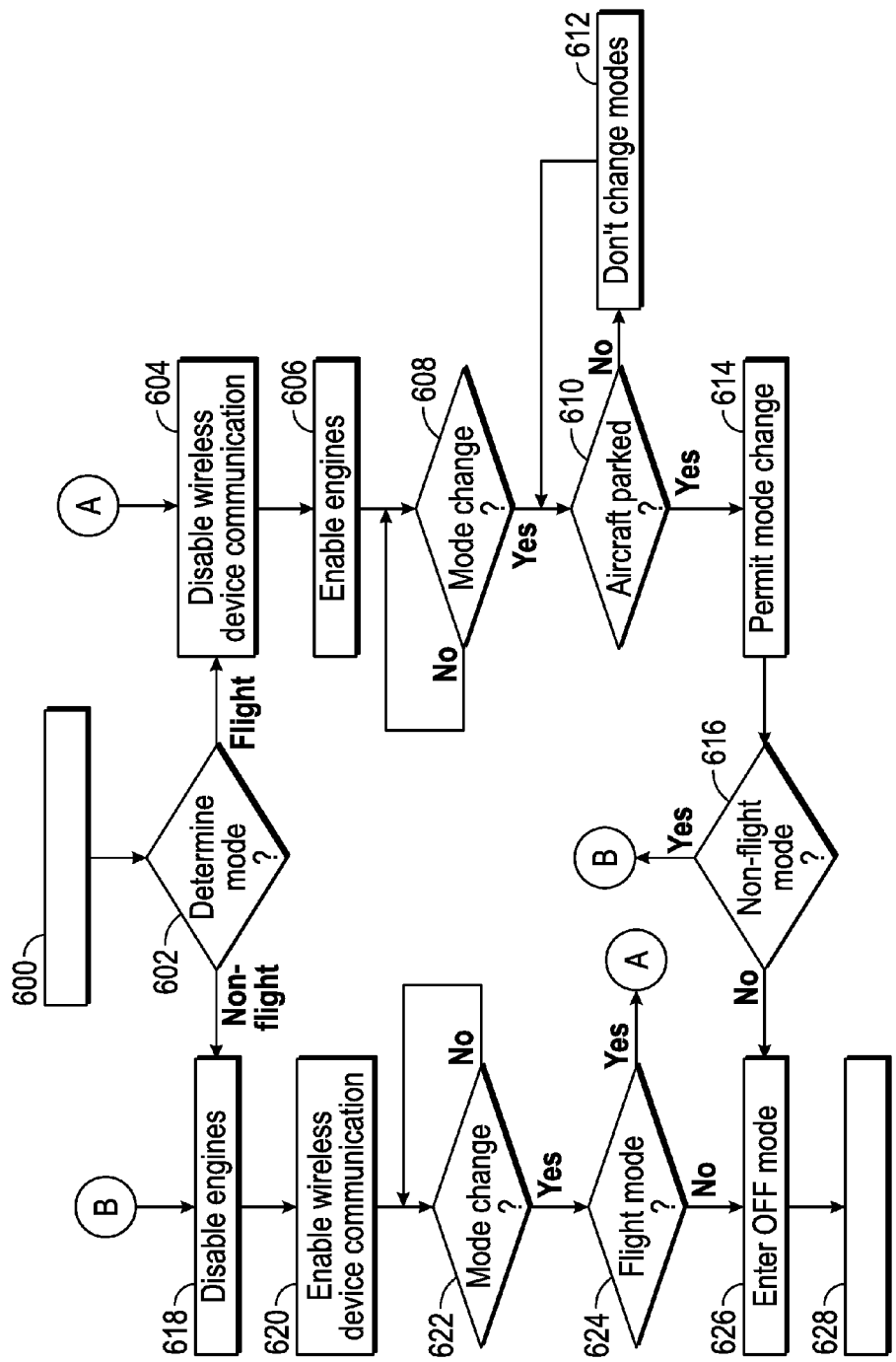
FIG. 6 is a flow diagram illustrating a method in accordance with an embodiment.

FIG. 6 is a flow diagram illustrating a method 600 in accordance with an embodiment. The routine begins in block 602 which determines whether the flight mode or the non-flight mode is selected. Assuming the aircraft is in the flight mode, block 604 disables access and communication between the wireless devices and critical aircraft systems. Next, block 606 enables cockpit control of all systems. The aircraft is now ready for flight. Block 608 determines whether the mode selection switch has been changed to another mode. Ideally, this would occur after the aircraft arrives at the destination airport, however, it is possible for the mode selection switch to be inadvertently changed. Accordingly, safeguards are implemented to prevent a mode change at inappropriate times. To this end, block 610 determines whether the aircraft is parked. This can be determined in a number of ways including having a zero ground speed, engines off, key systems powered down, and the like. If the aircraft is not parked, then block 612 does not permit the mode change and the routine continues to loop until block 610 determines that the aircraft is parked. When the aircraft is parked, block 614 permits the mode change and block 616 determines if the mode change has been from the previous flight mode to the non-flight mode. If so, the routine branches to block 618.

Block 618 is entered either by a determination by block 602 that the aircraft is in the non-flight mode or by decision 616 determining a mode change from the flight mode to the non-flight mode. In any event, block 618 disables the cockpit controls so that flight or powered movement of the aircraft is prevented. Next, block 620 enables communication with wireless devices so that the wireless devices can access and control the flight control systems as need to service the aircraft. Block 622 determines whether a mode change has occurred. If not, the routine loops until a mode change does occur. At that point, block 624 determines whether the mode change is from the non-flight mode to the flight mode. If so, the routine branches to block 604 and proceeds as described above. If the flight mode has not been selected, then the mode must have been changed to the Off mode which is entered in block 626. Block 616 can also be entered if block 616 determines that a mode change from the flight mode has not been a change to the non-flight mode. In either case, the Off mode is entered and the routine ends in block 628 until the mode is again changed and the routine begins again at block 602.

Although the preferred embodiment is an aircraft, this method and apparatus are applicable to other vehicles and systems (other vehicles, industrial plants, sound control systems) in which less-skilled operators need only some of the functionalities of the system using this apparatus and method. The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method for operating an aircraft, comprising:
    determining, by a processor in the aircraft, whether the aircraft is operating in a flight mode or a non-flight mode;
    deactivating aircraft engines and permitting wireless device access to one or more aircraft systems when the aircraft is operating in the non-flight mode; and enabling the aircraft engines and preventing wireless device access to the one or more aircraft systems when the aircraft is operating in the flight mode.

2. The method of claim 1, wherein determining comprises the processor determining whether a switch is set to the flight mode or the non-flight mode.

3. The method of claim 2, wherein determining comprises the processor determining whether the switch is set to the flight mode, the non-flight mode or an off-mode.

4. The method of claim 1, wherein permitting wireless device access to the one or more aircraft systems comprises permitting wireless access control of the one or more aircraft systems.

5. The method of claim 1, wherein permitting wireless device access to the one or more aircraft systems comprises permitting wireless device downloading or uploading of data of the one or more aircraft systems.

6. The method of claim 1, wherein permitting wireless device access to the one or more flight systems comprises permitting wireless access testing of the one or more aircraft systems.

7. The method of claim 1, wherein permitting wireless device access to the one or more flight systems comprises permitting wireless device flight pre-check of the one or more aircraft systems.

8. The method of claim 1, further comprising permitting wireless device access to aircraft cabin systems when the aircraft is operating in the flight mode.

9. The method of claim 1, wherein permitting wireless device access to the one or more flight systems comprises permitting wireless device flight pre-check of the one or more aircraft systems from the exterior of the aircraft.

10. An aircraft, comprising:
one or more engines to propel the aircraft during flight;
one or more aircraft systems to control the aircraft during flight;
a cabin including a cabin management system; and
a processor configured to:
    determine whether the aircraft is operating in a flight mode or a non-flight mode;
    deactivate the one or more aircraft engines and permitting wireless device access to the one or more aircraft systems when the aircraft is operating in the non-flight mode; and
    enable the aircraft engines and prevent wireless device access to the one or more aircraft systems when the aircraft is operating in the flight mode.

11. The aircraft of claim 10, further comprising a switch to select between the flight mode or the non-flight mode.

12. The aircraft of claim 10, wherein the switch is set to the flight mode, the non-flight mode or an off-mode.

13. The aircraft of claim 10, wherein the wireless device controls the one or more aircraft systems in the non-flight mode.

14. The aircraft of claim 10, wherein the wireless device is configured to download or upload data from the one or more aircraft systems in the non-flight mode.

15. The aircraft of claim 10, wherein the wireless device tests the one or more aircraft systems in the non-flight mode.

16. The aircraft of claim 10, wherein the wireless device is configured for flight pre-check of the one or more aircraft systems when in the non-flight mode.

17. The aircraft of claim 10, wherein the wireless device is configured for flight pre-check of the one or more aircraft systems when in the non-flight mode from the exterior of the aircraft.

18. The aircraft of claim 10, further comprising a cabin including a cabin management system, wherein wireless device access to the cabin systems is permitted when the aircraft is operating in the flight mode.

19. An aircraft, comprising:
one or more engines to propel the aircraft during flight;
one or more aircraft flights systems to control the aircraft during flight;
a cabin including a cabin management system; and
a processor configured to:
    determine whether the aircraft is operating in a flight mode or a non-flight mode;
    deactivate the one or more aircraft engines and systems and permitting wireless device access to the one or more aircraft systems and the cabin management system when the aircraft is operating in the non-flight mode; and
    enable the aircraft engines and prevent wireless device access to the one or more aircraft flight systems while permitting wireless access device access to the cabin management system when the aircraft is operating in the flight mode.

20. The aircraft of claim 19, wherein the wireless device is configured for flight pre-check of the one or more aircraft systems when in the non-flight mode.

* * * * *